United States Patent [19]

Schulmeister et al.

[11] 4,204,848
[45] May 27, 1980

[54] AIR FILTER INSTALLATION

[75] Inventors: Robert Schulmeister, Friedrichshafen; Franz Edmaier; Günther Kiefer, both of Markdorf, all of Fed. Rep. of Germany

[73] Assignee: Motoren-und Turbinen-Union Friedrichshafen GmbH, Fed. Rep. of Germany

[21] Appl. No.: 936,522

[22] Filed: Aug. 24, 1978

[30] Foreign Application Priority Data

Aug. 25, 1977 [DE] Fed. Rep. of Germany ....... 2738293

[51] Int. Cl.² .............................................. B01D 45/18
[52] U.S. Cl. ........................................ 55/269; 55/315;
55/383; 55/337; 55/473; 60/599; 123/119 CD
[58] Field of Search ................. 55/269, 267, 315, 318,
55/383, 474, 337, 348, 473; 123/119 C, 119 CD;
60/599

[56] References Cited

U.S. PATENT DOCUMENTS

| 3,143,849 | 8/1964 | Glamann | 123/119 C |
|---|---|---|---|
| 3,572,013 | 3/1971 | Hansen | 55/510 |
| 3,816,982 | 6/1974 | Regnault | 55/337 |
| 3,914,944 | 10/1975 | Schmidt et al. | 60/559 |

Primary Examiner—Norman Yudkoff
Attorney, Agent, or Firm—Craig and Antonelli

[57] ABSTRACT

An air filtering installation for an internal combustion engine equipped with a supercharger and a supercharger inter-cooler, in which the air filtering installation includes a centrifugal dust separator and a dry air filter with interchangeable filter insert; the centrifugal dust separator is thereby arranged on the suction side of the supercharger and the dry air filter is arranged downstream of the supercharger inter-cooler.

6 Claims, 1 Drawing Figure

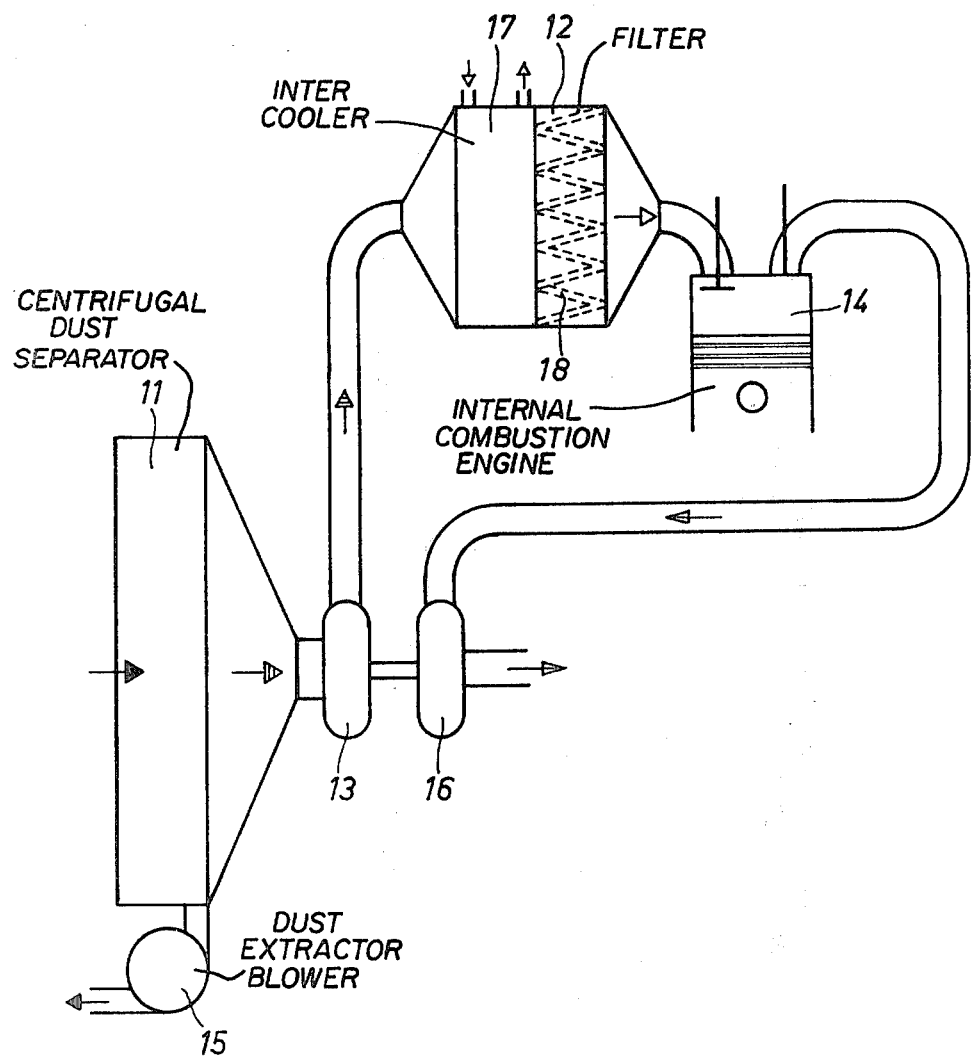

AIR FILTER INSTALLATION

The present invention relates to an air filtering installation for an internal combustion engine with a supercharger and with a supercharger or compressor inter-cooler, whereby the air filtering installation includes a centrifugal dust separator and a dry air filter with exchangeable filter insert.

The purpose of this type of air filtering installation is the supply of an internal combustion engine with dust-free combustion air for a low-wear operation.

Air filtering installations are known in the art which include a dry air filter arranged upstream of the supercharger inter-cooler. With such an arrangement, the filter insert of the dry air filter is exposed to the high temperatures resulting in the supplied combustion air as a consequence of the pressure increase by the supercharger. Depending on the extent of the pressure increase, air temperatures of up to about 200° C. are present downstream of the supercharger or compressor. Filter inserts of dry air filters which withstand these high air temperatures with an adequate service life, require the use of expensive materials. An additional increase in the cost of such filter inserts results from the fact that temperature-resistant filter materials are not sufficiently stable in themselves, i.e., inherently stable and rigid, and therefore require a support and mounting installation. Additionally, large external dimensions of the entire dry air filter result with the use of a filter insert having such a support and mounting device.

The exchange of the filter inserts required by reason of soiling is therefore a not inconsiderable cost factor in the course of the eventual service of the air filtering installation, especially if a frequent filter exchange is necessary by reason of an operation of the internal combustion engine in a dusty environment.

It is therefore the aim of the present invention to provide an air filter installation which combines compactness with low service costs coupled with a reliable operating safety for the internal combustion engine.

The underlying problems are solved according to the present invention in that the centrifugal dust separator is arranged on the suction side of the supercharging compressor and the dry air filter is arranged following the supercharger inter-cooler. The thermal load for the filter insert of the dry air filter is considerably smaller as a result of the cooling of the combustion air in the supercharger inter-cooler than with its arrangement ahead of the supercharger inter-cooler. As a result thereof, it is possible to utilize a less temperature-resistant material for the filter insert of the dry air filter which, however, is more favorable as regards cost and inherently stable.

According to the present invention, the filter insert of the dry air filter may consist of felt-like paper. An advantageous decrease of the structural volume of the filter insert results therefrom since paper felt can be utilized without support and mounting installation. With a filter insert that consists of a filter material folded several times zig-zag for purposes of achieving a large filter surface; additionally, a narrower or closer fold position is possible with the use of paper felt than with the aforementioned temperature-resistant filter materials.

A filter insert of paper felt has therefore a larger filter surface with the same structural volume than a filter insert of temperature-resistant filter material, or, in relation to the same air volume flow, a filter insert of paper felt results in a smaller filter structural size of the dry air filter than with the use of the temperature-resistant filter material.

Additionally, the cooling of the combustion air in the supercharger inter-cooler effects a density increase and therewith a reduction of the air volume flow of the combustion air which additionally results in a reduction of the filter structural size of the fine filter.

In order to assure a high operating safety, especially for the supercharging compressor and the supercharger inter-cooler, the centrifugal dust separator according to the present invention is of two-stage construction. A high separating degree is achieved therewith in the pre-cleaner so that a low-wear operation of the supercharging compressor is possible and a clogging of the air channels in the supercharger inter-cooler is prevented. The compactness of the air filter installation is additionally improved in that the supercharger inter-cooler and dry air filter form a structural unit.

The advantages achieved with the present invention consist especially in that in addition to the aimed-at decrease of the servicing costs, also the investment costs can be lowered by reason of the attainable reduction of the filter structural size.

Accordingly, it is an object of the present invention to provide an air filtering installation, especially for an internal combustion engine with a supercharger and a supercharger inter-cooler, which avoids by simple means the aforementioned shortcomings and drawbacks encountered in the prior art constructions.

Another object of the present invention resides in an air filtering installation for an internal combustion engine which assures a sufficient supply of dust-free combustion air for a low-wear operation of the internal combustion engine.

A further object of the present invention resides in an air filtering installation for an internal combustion engine which is reliable in operation, relatively inexpensive in cost and servicing and highly effective for its intended purposes.

Still another object of the present invention resides in an air filtering installation for an internal combustion engine in which filter materials can be utilized for the dry air filter that are relatively low in cost, yet ensure a relatively long service life.

Another object of the present invention resides in an air filtering installation of the type described above which is characterized by compactness and low cost as well as high efficiency.

Still another object of the present invention resides in an air filtering installation for an internal combustion engine which permits a decrease of the structural size of the air filtering installation without jeopardizing the efficiency and effectiveness thereof.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of an air filtering installation for an internal combustion engine in accordance with the present invention.

Referring now to the single FIGURE of the drawing, an air filtering installation for an internal combustion engine 14 indicated by means of a cylinder, consists of a centrifugal dust separator 11 as pre-separator with a dust extractor blower 15 which is arranged on the suction side of a supercharging compressor 13. The supercharging compressor 13 is driven, for example, by an exhaust gas turbine 16.

A dry air filter 12 which contains a filter insert 18 folded of felt-like mats is arranged on the pressure side of the supercharging compressor 13 following a supercharger inter-cooler 17.

In this manner, the filter insert 18 is exposed only to a slight thermal load because the combustion air is cooled off in the supercharger inter-cooler 17 from the high compression temperature which may amount up to above 200° C., to about 90° C. to 100° C. At these temperatures, also filter inserts 18 of paper felt which is favorable as regards cost can be used. In order to attain a compact type of construction for the air filtering installation, the supercharger inter-cooler 17 and the dry air filter 12 are combined into a structural unit.

A low wear operation of the supercharging compressor 13 is possible by the use of a centrifugal dust separator 11 with a high separating capacity which is achieved with certainty by a two-stage construction of the centrifugal dust separator 11, and additionally the clogging of the air channels of the supercharger inter-cooler is avoided thereby.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An air filtering installation for an internal combustion engine having a supercharging compressor and a supercharger inter-cooler means for cooling intake air for the engine, the air filter installation comprising a centrifugal dust separator means and a dry air filter means with an interchangeable filter insert, characterized in that the centrifugal dust separator means is arranged on a suction side of the supercharging compressor and the dry air filter means is arranged downstream of the supercharger inter-cooler means.

2. An air filtering installation according to claim 1, characterized in that the filter insert of the dry air filter means consists of paper filter element.

3. An air filtering installation according to claim 2, characterized in that the centrifugal dust separator means is of two-stage construction.

4. An air filtering installation according to claim 1, 2, or 3, characterized in that the supercharging inter-cooler means and the dry air filter means form a structural unit.

5. An air filtering installation according to claim 1, characterized in that the centrifugal dust separator means is of two-stage construction.

6. An air filtering installation according to claim 5, characterized in that the supercharging inter-cooler means and the dry air filter means form a structural unit.

* * * * *